United States Patent [19]

Kostrivas et al.

[11] Patent Number: 5,525,438
[45] Date of Patent: Jun. 11, 1996

[54] BATTERY CLOSURE APPARATUS

[75] Inventors: Charles W. Kostrivas, Wauwatosa; Mark E. Sauter, Shorewood; Bernard N. Spiegelberg, Germantown; Gary R. Whitcher, Glendale, all of Wis.

[73] Assignee: Tulip Corporation, Milwaukee, Wis.

[21] Appl. No.: 518,523

[22] Filed: Aug. 23, 1995

[51] Int. Cl.$^6$ ..................................................... H01H 2/36
[52] U.S. Cl. ........................... 429/87; 429/72; 429/88; 429/121; 429/163; 429/185
[58] Field of Search ...................... 429/87, 89, 72, 429/86, 88, 121, 163, 172, 175, 180, 187, 79

[56] References Cited

U.S. PATENT DOCUMENTS 2,570,123  10/1951  Heine .
3,284,244  11/1966  Lucas .
3,287,173  11/1966  Cox et al. .
3,669,755   6/1972  Hughes, Jr. .
3,943,007   3/1976  Lebrum .
3,943,008   3/1976  Schaumburg .
4,214,045   7/1980  Jutte et al. .
4,477,542  10/1984  Braswell .
4,562,126  12/1985  Chartrain et al. ..................... 429/72
5,132,175   7/1992  Mrotek et al. ........................ 429/86
5,356,734  10/1994  Oureshi .

*Primary Examiner*—M. Nuzzolillo
*Attorney, Agent, or Firm*—Foley & Lardner

[57] ABSTRACT

A battery closure apparatus for a multi-cell storage battery includes a cap assembly for the simultaneous rotation of a plurality of caps within receptacles on the multi-cell storage battery. The apparatus includes a plurality of caps pivotally attached to a pair of elongate arms. A grip member is coupled to the cap assembly. Application of force to the grip member will simultaneously rotate each cap to releasably secure the caps to the battery receptacles.

25 Claims, 2 Drawing Sheets

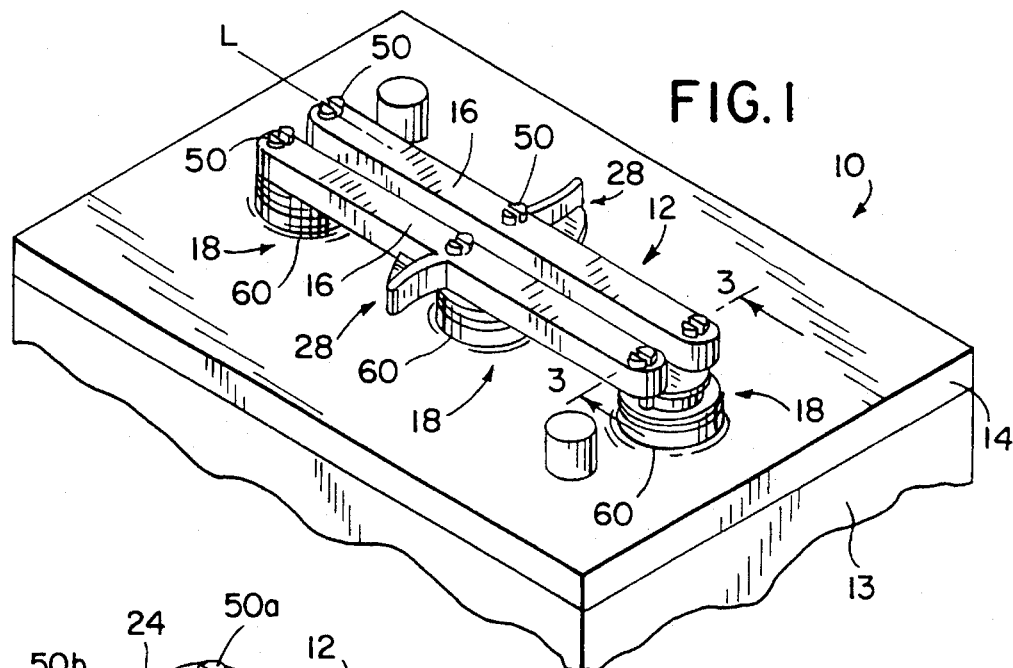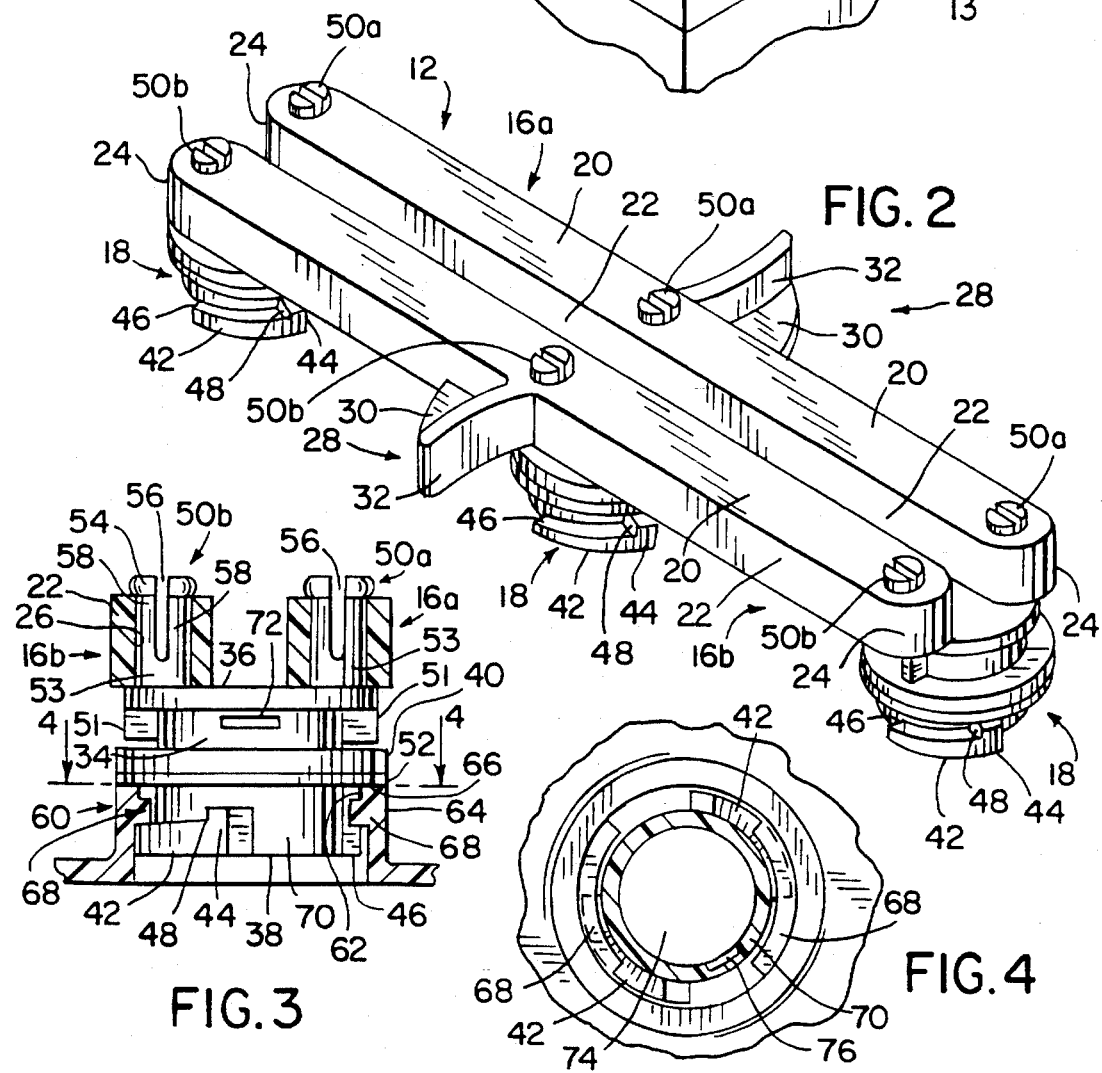

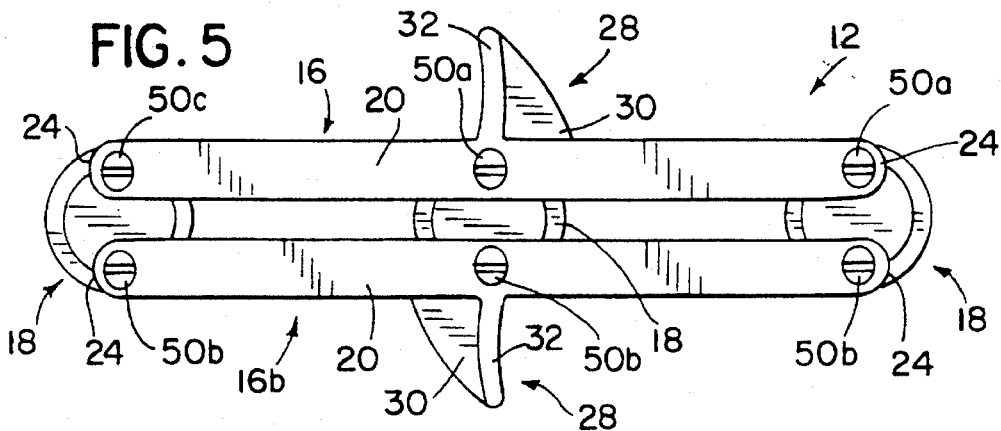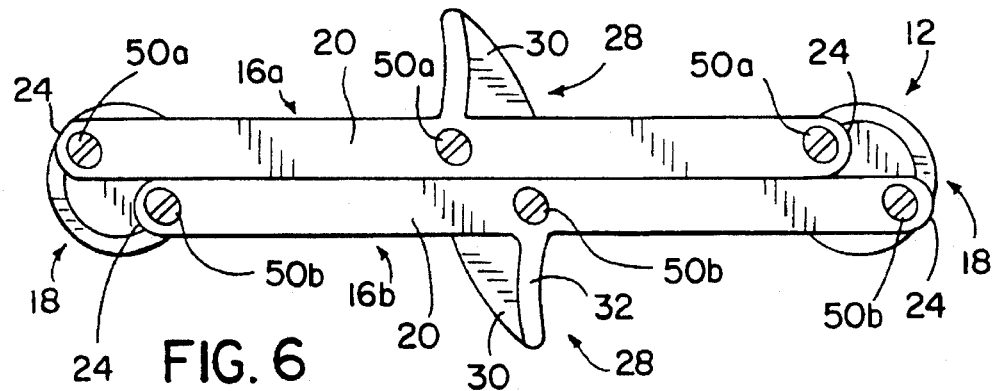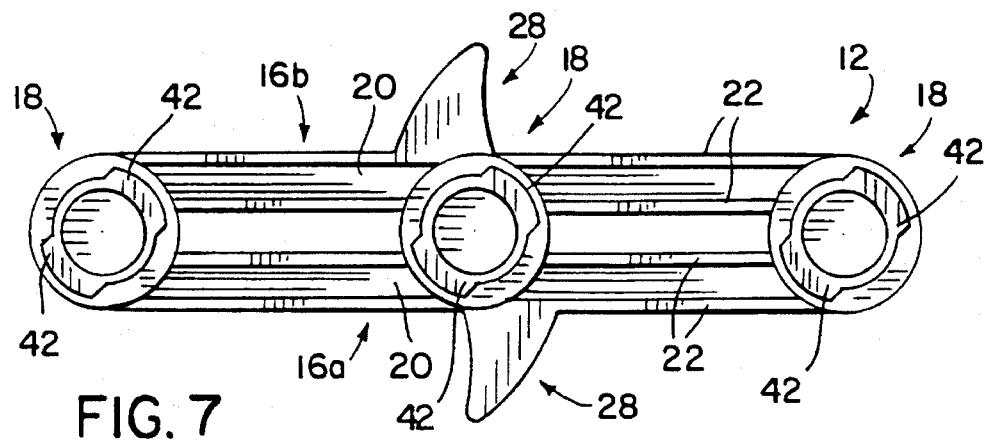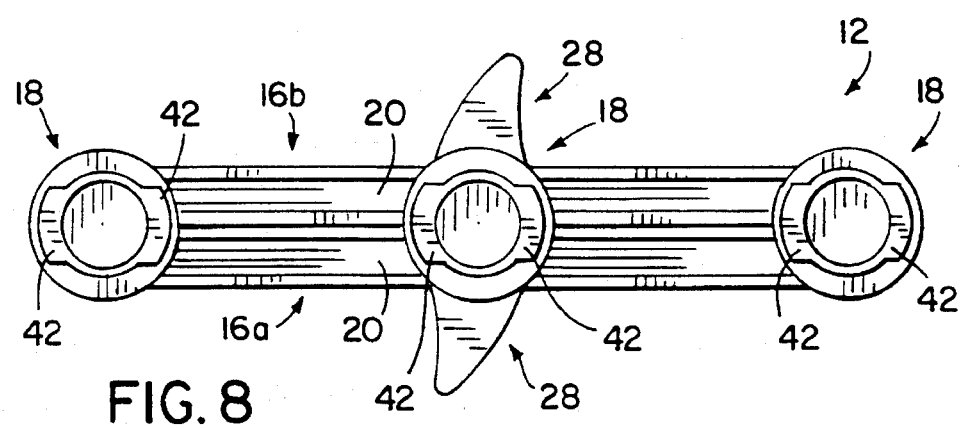

BATTERY CLOSURE APPARATUS

FIELD OF THE INVENTION

This invention relates to a battery closure apparatus for a multi-cell storage battery and more particularly to a cap rotation assembly for the simultaneous rotation of a plurality of caps on a battery cover.

BACKGROUND OF THE INVENTION

Storage type multi-cell batteries are utilized in a number of applications in which an array of batteries are employed as the power source. Examples include golf carts, electric vehicles used in industrial plants, and other applications as well. These batteries require continual inspection and service to ensure the proper liquid level is maintained within each cell of the battery. The inspection and service requires the removal of cell plugs located on the top of the battery to allow access to the battery cells to add electrolyte or water. In the past removal of individual cell plugs involved unscrewing each plug from each cell of every battery in the entire array.

A number of multiple battery plugs and containers are disclosed in the prior art to minimize the time required to inspect and service multi-cell batteries. One type of multiple vent plug utilizes a plurality of friction fit plugs joined together by a common member. These include for example the devices shown in U.S. Pat. No. 2,570,123 issued Oct. 2, 1951 to Heine for "Device For Facilitating The Checking Of Storage Batteries"; U.S. Pat. No. 3,284,244 issued Nov. 8, 1966 to Lucas for "Multiple Vent Plug Assembly"; U.S. Pat. No. 3,943,008 issued Mar. 9, 1976 to Schaumburg for "Blow Molded Gang-Type Vent For A Multiple-Cell Electric Storage Battery"; U.S. Pat. No. 4,214,045 issued Jul. 22, 1980 to Jutte et al. for "Container For A Maintenance Free Batter"; U.S. Pat. No. 3,287,173 issued Nov. 22, 1966 to Cox et al. for "Battery Closure"; and U.S. Pat. No. 5,356,734 issued Oct. 18, 1944 to Oureshi for "Battery Closure Means". These devices require the operator to unsnap or pull the vent plugs from the vents in the battery cover in order to remove the vent plug assembly from the battery.

A second type of multiple vent plug is disclosed in U.S. Pat. No. 3,669,755 issued Jun. 13, 1972 to Hughes for "Battery Closure Device" in which a slide unit is located under the battery cover permitting access to the cells by sliding the unit from one side of the cover to the other.

Another type of multiple vent device is disclosed in U.S. Pat. No. 4,477,542 issued Oct. 16, 1984 to Braswell for "Quick Release Storage Battery Closure Assembly". This device includes a plurality of caps which are pivotally removed from the battery by a linkage mechanism having a number of components. This assembly includes a center member and two members offset from the first. The configuration of this device encompasses an area substantially greater than that of the plugs themselves. Additionally, in a three cell battery, the device requires two different types of plugs to support the linkage mechanism.

Consequently it would be desirable to have a battery cap assembly that would allow for the quick release and removal of vent plugs which was compact and comprised of few components.

SUMMARY OF THE PRESENT INVENTION

The present invention relates to a multi-cell battery and a battery closure apparatus for the quick attachment and removal of a plurality of caps from a multi-cell battery. The battery closure apparatus includes a battery cap assembly operable to engage a plurality of receptacles in a battery cover. The battery cap assembly includes a plurality of caps and a pair of elongate arms substantially parallel to one another. In one embodiment each arm includes a grip member extending from the arm. The pair of arms are pivotally connected to each cap with a pair of fasteners offset from the center of each cap. Each cap is releasably secured within a receptacle in the battery cover.

Other principal features and advantages of the invention will become apparent to those skilled in the art upon review of the following drawings, the detailed description and the appended claims.

BRIEF DESCRIPTION OF THE DRAWINGS

The invention will hereafter be described with reference to the accompanying drawings, wherein like reference numerals denote like elements, and:

FIG. 1 is an isometric view of a multi-cell battery and a battery closure apparatus;

FIG. 2 is an isometric view of the battery cap assembly;

FIG. 3 is a cross-sectional view taken generally along line 3—3 of FIG. 1;

FIG. 4 is a cross-sectional view taken generally along line 4—4 of FIG. 3;

FIG. 5 is a top view of the battery cap assembly in the engaged position;

FIG. 6 is a top view of the battery cap assembly in the disengaged position;

FIG. 7 is a bottom view of the battery cap assembly in the engaged position; and FIG. 8 is a bottom view of the battery cap assembly in the disengaged position.

DETAILED DESCRIPTION OF THE PREFERRED EMBODIMENT

Referring to FIG. 1, a detailed description of an exemplary battery closure system 10 will be described. Battery cap closure system 10 includes a cap assembly 12 which is releasably secured to a battery cover 14 of a multi-cell battery 13 having receptacle 60 associated with each cell thereof.

Referring to FIG. 2, cap assembly 12 includes a pair of arms 16, and three caps 18. However, various battery configurations would require fewer or greater number of caps. Pair of arms 16, includes a first arm 16a and a second arm 16b. Arms 16a and 16b are substantially parallel to one another. Each arm 16 is formed from a U-shaped member having a top wall 20, two side walls 22 and two ends 24 having an arcuate form as shown (FIG. 2). However, each arm may be solid or have other shapes including for example a square end, or a bottom wall.

In the preferred embodiment each arm includes three openings 26 (FIG. 3) extending through top wall 20 along a longitudinal axis L. One opening 26 is located proximate each end 24 of arm 16 and a third opening is located between ends 24. However, depending on the configuration of battery 13 associated with cap assembly 12, arms 16 may include a different number of openings 26.

Each arm 16 further includes a grip member 28 integrally formed and extending from side wall 22. Grip member 28 Includes a web portion 30 substantially parallel to top wall 20 of arm 16, and a grip portion 32 substantially normal to side wall 22 and web portion 30. It may be possible to form grip member 28 without web portion 30. Further, it may also be possible for grip member 28 to be integrally formed with center or end caps 18.

Referring to FIGS. 2 and 3, each cap 18 includes a cylindrical body 34 having a top end 36 and a bottom end 38. Each cap includes a pair of annular cap ramps 42 located opposite one another and proximate bottom end 38. Cap ramps 42 extends radially from cylindrical body 34 and increases in thickness axially from bottom end 38 toward top end 36 in a counterclockwise direction. In this manner cap ramps 42 form a ramp. Each cap ramp 42 terminates with a ramp stop 44. Each cap ramp 42 further includes a cap ramp entrance 46 and a ramp end 48 proximate ramp stop 44. Each cap ramp 42 extends about cylindrical body 34 approximately 90 degrees. More generally, cap ramps 42 are a form of thread such as those on a threaded fastener.

Each cap 18 further includes a pair of fasteners 50 offset from the center of cap 18 and extending normally from top end 36. Pair of fasteners 50 include a first fastener 50a and a second fastener 50b. Referring to FIG. 3, fasteners 50 are integrally formed with cap top end 36 having a cylindrical post 53, a head 54, a resilient pair of prongs 58, and a center recess 56 defined between pair of prongs 58. Center recess 56 extends through head 54 a set distance toward cap top end 36. Center recess 56 allows each prong 58 to be moved toward one another. Head 54 has a diameter greater than openings 26 of arms 16. Cylindrical post 53 has a diameter less than the diameter of openings 26 of arms 16. However, it is also possible to utilize a mechanical fastener, such as a bolt with a shank having bearing portion.

Cap 18 further includes a pair of support ribs 51 for structural rigidity. Support ribs 51 are integrally formed and extend from top end 36 toward bottom end 38.

Extending radially from cylindrical body 34 intermediate top end 36 and bottom end 38 is a shoulder 40. Shoulder 40 extends radially outward from cylindrical body 34 located intermediate top and bottom ends 36, 38 and above cap ramps 42. Located below shoulder 40 is a gasket 52 having an inner diameter slightly smaller than cylindrical body 34, to form an interference fit, and an outer diameter greater than the outer diameter of shoulder 40. However gasket 52, may have a range of sizes.

Cylindrical body 34 includes a cylindrical wall 70 defining an internal cavity having an opening at cap bottom end 38 extending toward cap top end 36. Cylindrical body 34 includes a vent opening 72 extending through the cylindrical wall in communication with the internal cavity. As shown is FIG. 3, vent opening 72 is located intermediate top end 36 and shoulder 40. A flame retardant foam disc (not shown) is located within the internal cavity proximate vent opening 72. However, in an alternative embodiment a flame retardant foam disc is not included. Cap 18 also includes a cylindrical shield 74 located within the cavity intermediate the foam disc and cap bottom end 38. Cylindrical wall 70 includes a groove 76 to provide a passageway from bottom end 38 to the internal cavity. In this way gas is permitted to pass from multi-cell battery 13 past cylindrical shield 74 into the internal cavity and escape through vent opening 72.

Referring again to FIGS. 2 and 3, caps 18 are pivotally fastened to arms 16 at fastener 50. First arm 16a is attached to first fastener 50a of each cap. First fastener 50a extends through arm 16a at opening 26, such that head 54 rests on top wall 20. Similarly, second fastener 50b extends though second arm 16b at opening 26. Fasteners 50 are attached to arms 16 by compressing prongs 58 toward one another to allow head 54 fit through openings 26 in arms 16. Once head 54 clears opening 26, prongs 58 spring back such that cap 18 is pivotally attached to arm 16.

Referring to FIGS. 1 and 3, battery cover 14 of battery 13 includes a plurality of receptacles 60 having an opening 62. Each receptacle 60 includes a raised annular portion 64 having a top surface 66 and a pair of arcuate members 68 proximate top surface 66. Each arcuate member 68 extends radially inward a constant distance. The thickness of each arcuate member 68 in the axial direction of receptacle 60 increases in the clockwise direction thereby forming a cover ramp. However it is possible for arcuate members 68 to have a uniform thickness. In general, arcuate members 68 are a form of thread configured to mate with cap ramps 42 to positively engage caps 18 with battery cover 14 at receptacles 60.

The operation of battery cap assembly will now be described. Referring to FIGS. 6 and 8, battery cap assembly is illustrated in the disengaged position. In this position, cap ramps 42 are centered along longitudinal axis L'. In this position each cap 18 may be inserted within receptacle 60 such that gasket 52 is flush against top surface 66. Cap ramps 42 fit between battery cover arcuate members 68. Additionally, once gasket 52 is flush with top surface 66 cap ramp entrance 46 is situated below battery cover arcuate members 68.

Applying pressure against grip portions 32 in the clockwise direction caps 18 are simultaneously rotated such that cap ramps 42 engages battery cover arcuate members 68. As illustrated in FIGS. 3 and 4, as each set of cap ramps 42 and associated battery cover arcuate members 68 are engaged, shoulder 40 is drawn toward top surface 66 to form a seal between cap assembly 12 and battery cover 14 by compressing gasket 52 therebetween.

As illustrated in FIGS. 5 and 7, when arms 16 are situated such that ends 24 are aligned, cap assembly 12 is in the engaged position. In this engaged position, cap ramps 42 are centered at forty five (45) degrees from longitudinal axis L' of cap assembly 12.

Cap assembly 12 is disengaged by applying pressure to grip portions 32 in the counterclockwise direction. In this manner cap ramp 42 is disengaged from battery cover arcuate member 68, permitting cap assembly 12 to be removed.

Although the invention has been described in conjunction with specific embodiments thereof, it is evident that many alternatives, modifications and variations will be apparent to those skilled in the art. For example, if cap assembly 12 is configured to include grip portions 32 integrally formed with one of caps 18 instead of arms 16, the user would cause simultaneous rotation of all caps 18 by transmitting the rotational force through arms 16 from cap 18 including portions 32. Accordingly, it is intended to embrace all such alternatives, modifications and variations that fall within the spirit and broad scope of the appended claims.

What is claimed is:

1. A battery cap assembly comprising:

a plurality of caps;

a pair of elongate arms substantially parallel to one another, the pair of elongate arms being pivotally connected to each cap with a pair of fasteners offset from the center of each cap; and at least one grip member mechanically coupled to the elongate arms, where application of force to the grip member will simultaneously rotate the plurality of caps.

2. The battery cap assembly of claim 1, wherein the grip member is integrally formed with the elongate arm.

3. The battery cap assembly of claim 1, wherein the grip member is integrally formed with one of the caps.

4. The battery cap assembly of claim 1, wherein the pair of fasteners are integrally formed with each cap.

5. The battery cap assembly of claim 4, wherein each fastener includes a post having a head, a pair of prongs, and a recess defined between the pair of prongs.

6. The battery cap assembly of claim 5, wherein the arms include a plurality of openings configured to receive the fasteners.

7. The battery cap assembly of claim 6, wherein each arm includes an integrally formed grip member.

8. The battery cap assembly of claim 7, wherein each arm includes a top wall and a pair of side walls, wherein the grip member includes a web portion substantially parallel to the side wall, and a grip portion substantially normal to the web portion, and side wall.

9. The battery cap assembly of claim 1, wherein each cap includes:

a cylindrical body having a top end and a bottom end;

a shoulder intermediate the top end and bottom end; and a pair of arcuate ramps located opposite one another about the cylindrical body proximate the bottom end.

10. The battery cap assembly of claim 9 wherein, each cap includes a gasket located against the shoulder.

11. The battery cap assembly of claim 10, wherein each cap ramp extends radially from the cylindrical body and increases in thickness axially from the bottom end toward the top end in a counterclockwise direction.

12. A battery closure apparatus for the quick attachment and removal of a plurality of caps from a multi-cell battery, the battery closure apparatus comprising:

a battery cover including a plurality of receptacles;

a battery cap assembly having a plurality of caps, a pair of elongate arms substantially parallel to one another, each arm having a grip member extending therefrom, the pair of arms being pivotally connected to each cap with a pair of fasteners offset from the center of each cap; and each cap is releasably secured within a receptacle.

13. The battery closure apparatus of claim 12, wherein the pair of fasteners are integrally formed with each cap, each fastener including a post having a head, a resilient pair of prongs, and a recess defined between the pair of prongs.

14. The battery closure apparatus of claim 13, wherein the arms include a plurality of openings to receive the fasteners.

15. The battery closure apparatus of claim 14, wherein each arm includes a top wall and a pair of side walls, wherein the grip member is integrally formed with each arm and includes a web portion substantially parallel to the side wall, and a grip portion substantially normal to the side wall and web portion.

16. The battery closure apparatus of claim 12, wherein each cap includes:

a cylindrical body having a top end and a bottom end;

a shoulder intermediate the top end and bottom end; and a pair of arcuate ramps located opposite one another about the cylindrical body proximate the bottom end.

17. The battery closure apparatus of claim 16 wherein, each cap includes a gasket located about the cylindrical body against the shoulder.

18. The battery closure apparatus of claim 17, wherein each cap ramp extends radially from the cylindrical body and increases in thickness axially from the bottom end toward the top end in a counterclockwise direction.

19. The battery closure apparatus of claim 18 wherein each receptacle includes a raised annular portion having a top surface and a pair of arcuate members proximate the top surface and extending radially inward from the raised annular portion.

20. A multi-cell battery comprising:

a plurality of receptacles associated with each cell of the battery;

a battery cap assembly having a plurality of caps and a pair of elongate arms substantially parallel to one another, the pair of elongate arms being pivotally connected to each cap with a pair of fasteners offset from the center of each cap; and at least one grip member mechanically coupled to the battery cap assembly, where application of force to the grip member will simultaneously rotate the plurality of caps to releasably secure each cap within a receptacle.

21. The multi-cell battery of claim 20, wherein the grip member is integrally formed with the elongate arm.

22. The multi-cell battery of claim 20, wherein the grip member is integrally formed with one of the caps.

23. The multi-cell battery of claim 20, wherein the pair of fasteners are integrally formed with each cap, each fastener including a post having a head, a resilient pair of prongs, and a recess defined between the pair of prongs.

24. The multi-cell battery of claim 20, wherein each receptacle includes a raised annular portion having a top surface and a pair of arcuate members proximate the top surface and extending radially inward from the raised annular portion.

25. The multi-cell battery of claim 20, wherein each cap includes at least one ramp to rotatably engage the arcuate members within each receptacle.

* * * * *